United States Patent
Ando et al.

(10) Patent No.: US 6,807,476 B2
(45) Date of Patent: Oct. 19, 2004

(54) DRIVING APPARATUS AND AUTOMOBILE

(75) Inventors: Daigo Ando, Sizuoka-ken (JP); Masaya Amano, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/370,567

(22) Filed: Feb. 24, 2003

(65) Prior Publication Data

US 2003/0163244 A1 Aug. 28, 2003

(30) Foreign Application Priority Data

Feb. 22, 2002 (JP) ........................................ 2002-046690
Nov. 26, 2002 (JP) ........................................ 2002-342632

(51) Int. Cl.[7] ............................................. G06F 19/00
(52) U.S. Cl. ..................... 701/110; 701/112; 123/179.4; 123/436
(58) Field of Search ............................ 701/51, 53, 103, 701/112, 110; 123/245, 406.25, 406.24, 436, 179.4

(56) References Cited

U.S. PATENT DOCUMENTS 5,632,238 A * 5/1997 Furukawa et al. ....... 123/179.3
5,826,671 A * 10/1998 Nakae et al. ............... 180/65.2
2003/0041830 A1 * 3/2003 Sugiura et al. ............ 123/179.4

FOREIGN PATENT DOCUMENTS

JP      02-041689      9/1990
JP      09-264235      7/1997

* cited by examiner

*Primary Examiner*—Henry C. Yuen
*Assistant Examiner*—Johnny H. Hoang
(74) *Attorney, Agent, or Firm*—Kenyon & Kenyon (57) ABSTRACT

In response to an operation stop instruction of an engine, the technique of the invention carries out control to make the engine stop at a specific position that is far from a first compression stroke at a subsequent start of the engine, for example, at a target stop position θt set at a top dead center of a piston in a proximate compression stroke, which is immediately before the first compression stroke. In the first compression stroke at the subsequent start of the engine, the revolving speed of the engine stopped at the specific position is significantly higher than the revolving speed of the engine stopped at a position close to the first compression stroke. Such control thus ensures a smooth compression stroke at the subsequent start of the engine.

20 Claims, 5 Drawing Sheets

DRIVING APPARATUS AND AUTOMOBILE

BACKGROUND OF THE INVENTION

1. Field of the Invention

The present invention relates to a driving apparatus and an automobile. More specifically the invention pertains to a driving apparatus, which includes an internal combustion engine and a torque output device to output a torque to an output shaft of the internal combustion engine, as well as to an automobile with such a driving apparatus mounted thereon.

2. Description of the Prior Art

A proposed driving apparatus includes a motor generator disposed between an internal combustion engine and a transmission (for example, JAPANESE PATENT LAID-OPEN GAZETTE No. 2-41689). At the time of starting the internal combustion engine, this driving apparatus carries out fuel injection control and ignition control based on a crank angle, which is calculated from a reference crank angle signal detected by a cylinder detection sensor attached to the internal combustion engine.

The prior art driving apparatus can not perform the fuel injection control or the ignition control until detection of the reference crank angle signal by the cylinder detection sensor. This leads to a relatively slow start of the internal combustion engine. One possible measure against such drawback allows for the fuel injection control prior to detection of the reference crank angle signal. This, however, causes poor emission.

SUMMARY OF THE INVENTION

The object of the present invention is thus to ensure a quick start of an internal combustion engine in a driving apparatus and in an automobile with the driving apparatus. The object of the invention is also to enhance the starting ability of an internal combustion engine in a driving apparatus and in an automobile with the driving apparatus.

In order to attain part of the above objects, the applicant of the invention has previously proposed a control technique of utilizing a motor generator, which drives and brakes an internal combustion engine, so as to make the internal combustion engine stop at a specific position that allows for detection of a crank angle at an early stage after a start of the internal combustion engine (JAPANESE PATENT LAID-OPEN GAZETTE No. 8-75036).

In order to achieve at least a part of the aforementioned objects, a driving apparatus and an automobile of the present invention are structured as follows.

The driving apparatus of the present invention includes: an internal combustion engine; a torque output device that outputs a torque to an output shaft of the internal combustion engine; and a controller that controls the internal combustion engine to stop operations of the internal combustion engine in response to an operation stop instruction of the internal combustion engine, while controlling operations of the torque output device on the basis of a first compression stroke at a subsequent start of the internal combustion engine as a standard, in order to make the internal combustion engine stop at a target stop position that is different from the standard by a predetermined angle.

The driving apparatus of the present invention carries out the control on the basis of the first compression stroke at the subsequent start of the internal combustion engine as the standard, in response to an operation stop instruction of the internal combustion engine, in order to make the internal combustion engine stop at a target stop position, which is different from the standard by a predetermined angle. This arrangement desirably enhances the revolving speed of the output shaft of the internal combustion engine during rotation of the predetermined angle before the first compression stroke at the subsequent start of the internal combustion engine. This effectively improves the starting ability of the internal combustion engine. Here the 'first compression stroke' is an initial compression stroke at the time of starting the internal combustion engine. In a multiple-cylinder internal combustion engine, the term 'first compression stroke' means a compression stroke of any cylinder that initially has the compression stroke and includes a stroke of the piston from a bottom dead center to a top dead center. The driving apparatus of the present invention may be mounted on automobiles as well as other movable bodies.

As one aspect, the driving apparatus in this present invention may further include: a rotation angle sensor that measures a rotation angle of the output shaft of the internal combustion engine, wherein the controller controls the operations of the torque output device to make the internal combustion engine stop at the target stop position, based on the rotation angle measured by the rotation angle sensor. In this case, the controller may expect a stop position of the internal combustion engine based on a variation in observed rotation angle and control the operations of the torque output device based on the expected stop position, in order to make the internal combustion engine stop at the target stop position. Further, the controller may control the operations of the torque output device, in order to make the internal combustion engine stop at the target stop position, while revolving speed of the internal combustion engine decreases to zero.

As another aspect of the driving apparatus in the present invention, the target stop position may be a specific position that is far from the first compression stroke or a specific position in a proximate compression stroke immediately before the first compression stroke at the subsequent start of the internal combustion engine. In the latter case, the target stop position may be set approximately at a top dead center of a piston in the proximate compression stroke. In these cases, the controller may control the operations of the torque output device, in order to hold the internal combustion engine at the target stop position for a predetermined time period.

As still another aspect, the driving apparatus in the present invention may include: a three-shaft power distribution and integration mechanism that has three shafts respectively linked with the output shaft of the internal combustion engine, a drive shaft, and a rotating shaft, where power input into and output from a residual one shaft among the three shaft is determined according to powers input into and output from any two shafts among the three shafts, wherein the torque output device comprises a first motor that outputs a torque to the rotating shaft, and a second motor that outputs a torque to the drive shaft. In this case, the driving apparatus in the present invention may include a rotation angle sensor that measures a rotation angle of the output shaft of the internal combustion engine, based on a rotation angle of the drive shaft and a rotation angle of the rotating shaft, wherein the controller controls the operations of the torque output device to make the internal combustion engine stop at the target stop position, based on the rotation angle measured by the rotation angle sensor. As further still another aspect of the driving apparatus in the present invention, the torque output device may include a pair-rotor motor and a drive shaft motor that outputs a torque to the drive shaft, the pair-rotor motor including a first rotor that is linked with the output shaft of the internal combustion engine and a second rotor that is linked with the drive shaft and is rotatable relative to the first rotor, where the first rotor is driven and rotated relative to the second rotor through electromagnetic actions.

DESCRIPTION OF THE PREFERRED EMBODIMENTS

Figure 1:
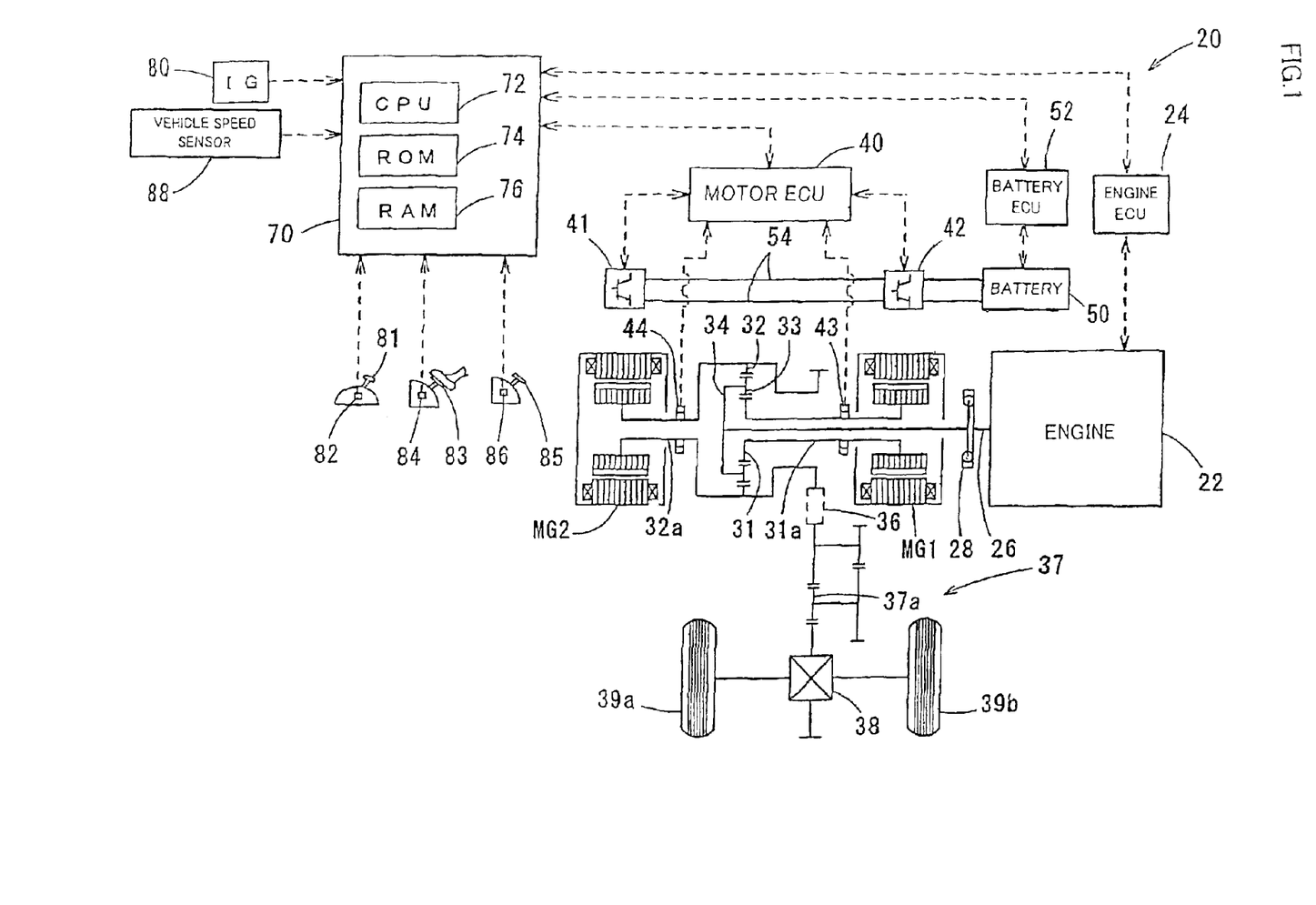
FIG. 1 schematically illustrates the construction of a hybrid vehicle 20 with a driving apparatus mounted thereon in one embodiment of the present invention.

One mode of carrying out the invention is discussed below as a preferred embodiment. FIG. 1 schematically illustrates the construction of a hybrid vehicle 20 with a driving apparatus mounted thereon in one embodiment of the present invention. The hybrid vehicle 20 of the embodiment includes an engine 22, a three-shaft power distribution and integration mechanism 30 that is linked with a crankshaft 26 or output shaft of the engine 22 via a damper 28, power-generable motors MG1 and MG2 that are connected to the power distribution and integration mechanism 30, and a hybrid electronic control unit 70 that controls the respective constituents of the whole driving apparatus.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the motor MG2. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The ring gear 32 is mechanically linked with front driving wheels 39a and 39b via a belt 36, a gear mechanism 37, and a differential gear 38. The power output to the ring gear 32 is thus transmitted to the driving wheels 39a and 39b via the belt 36, the gear mechanism 37, and the differential gear 38. The driving apparatus has three shafts linked with the power distribution and integration mechanism 30. The three shafts include the crankshaft 26 that is coupled with the carrier 34 and is the output shaft of the engine 22, a sun gear shaft 31a that is coupled with the sun gear 31 and is a rotating shaft of the motor MG1, and a ring gear shaft 32a that is coupled with the ring gear 32 and is mechanically linked with the driving wheels 39a and 39b.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements. The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature measured by a temperature sensor (not shown) attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and an input-output port and a communication port (not shown). The hybrid electronic control unit 70 receives input of various data and signals via the input port. The input includes, for example, an ignition signal from an ignition, switch 80, a gearshift position SP transmitted from a gearshift position sensor 82 that detects the operating position of a gearshift lever 81, an accelerator opening AP transmitted from an accelerator pedal position sensor 84 that measures the step-on amount of an accelerator pedal 83, a brake pedal position BP transmitted from a brake pedal position sensor 86 that measures the step-on amount of a brake pedal 85, and a vehicle speed V measured by a vehicle speed sensor 88. As mentioned previously, the hybrid electronic control unit 70 connects with the engine ECU 24, the motor ECU 40, and the battery ECU 52 via the communication port and transmits various control signals and data to and from the engine ECU 24, the motor ECU 40, and the battery ECU 52.

Figure 2:
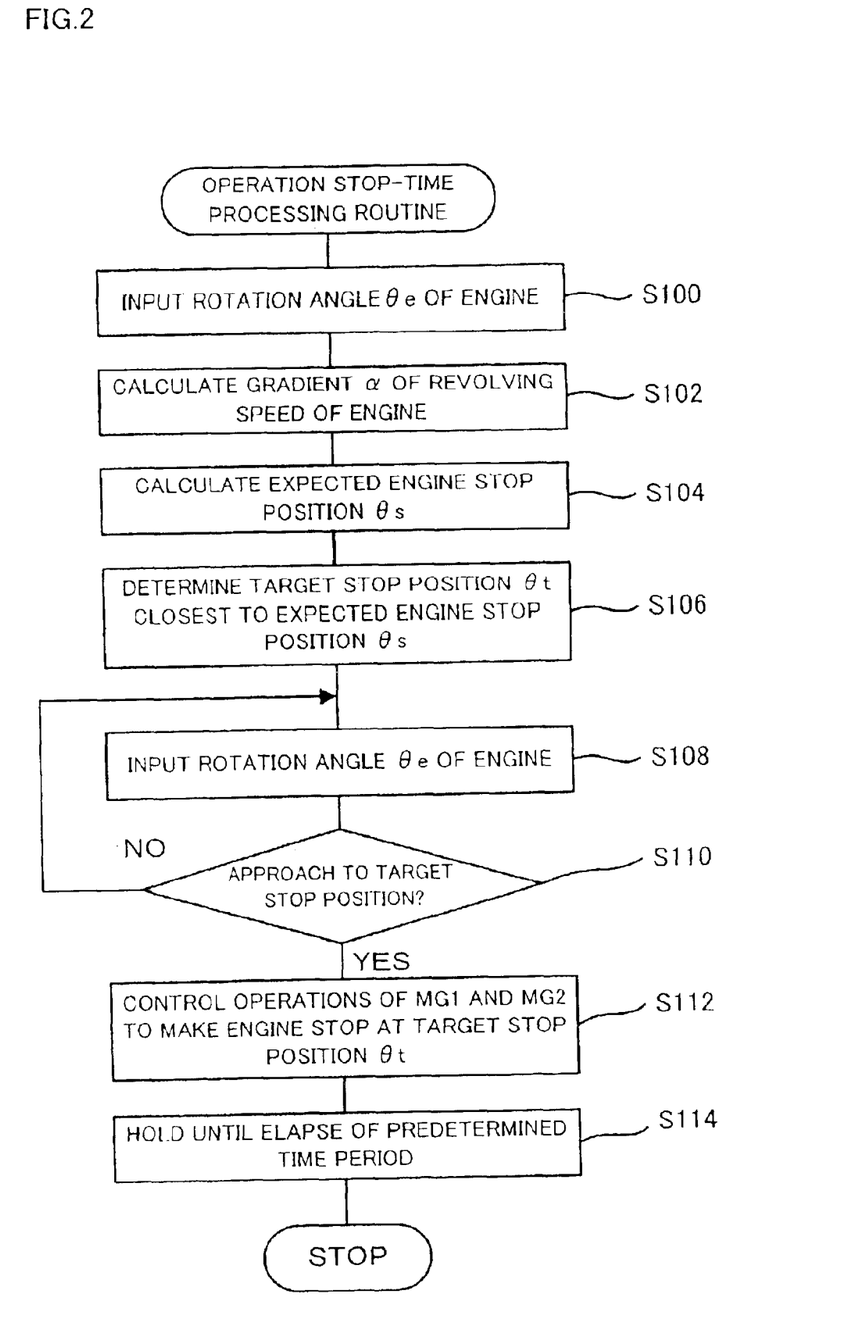
FIG. 2 is a flowchart showing an operation-stop time processing routine executed by a hybrid electronic control unit 70.

The following describes the operations of the hybrid vehicle 20 of the embodiment thus constructed, especially a series of operations at the time when the engine 22 is at a stop. FIG. 2 shows an operation stop-time processing routine executed by the hybrid electronic control unit 70. This routine is executed in response to an instruction of stopping the operations of the engine 22. Simultaneously with a start of the operation stop-time processing routine, the engine ECU 24 stops fuel injection in the engine 22.

Figure 3:
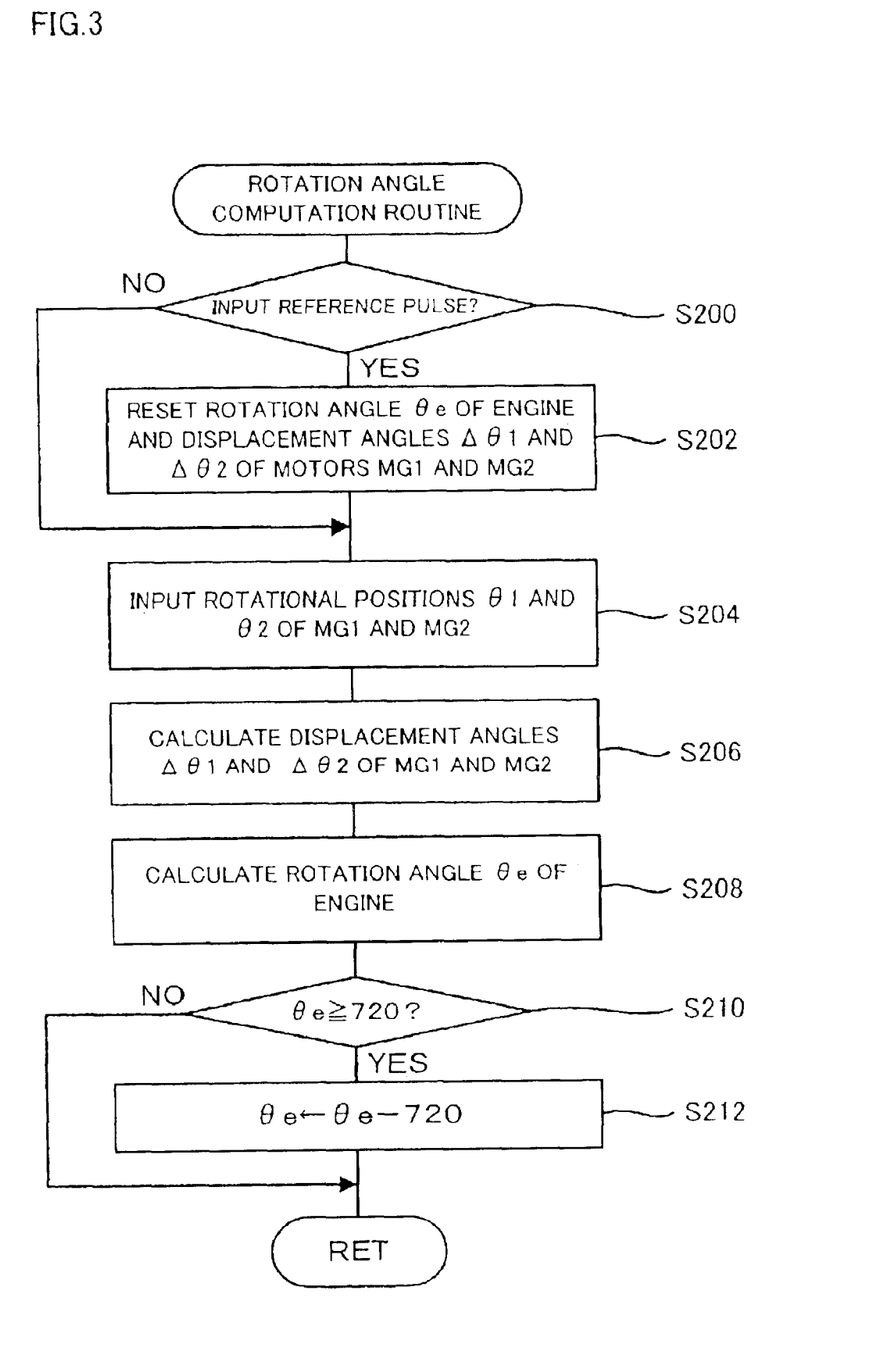
FIG. 3 is a flowchart showing a rotation angle computation routine executed by a hybrid electronic control unit 70.

When the program enters the operation stop-time processing routine, the CPU 72 of the hybrid electronic control unit 70 first reads a rotation angle θe of the engine 22 multiple times (step S100). In the procedure of the embodiment, the rotation angle θe of the engine 22 is computed according to a rotation angle computation routine shown in the flowchart of FIG. 3 and is written at a predetermined address in the RAM 76. The processing of step S100 accordingly reads the rotation angle θe from the predetermined address in the RAM 76. The process of computing the rotation angle θe of the engine 22 is described briefly with reference to the flowchart of FIG. 3. In the rotation angle computation routine, the CPU 72 resets the rotation angle θe of the engine 22 and displacement angles Δθ1 and Δθ2 of the motors MG1 and MG2 in response to input of a reference pulse from a G sensor, which outputs a reference value of the rotation angle of the crankshaft 26 in the form of a pulse (steps S200 and S202). The CPU 72 reads rotational positions θ1 and θ2 of the motors MG1 and MG2 from the rotational position detection sensors 43 and 44 and calculates the displacement angles Δθ1 and Δθ2 after the reset (steps S204 and S206). The CPU 72 then calculates the rotation angle θe of the engine 22 from the calculated displacement angles Δθ1 and Δθ2 and a gear ratio ρ(the ratio of the number of teeth of the sun gear 31 to the number of teeth of the ring gear 32) set in the power distribution and integration mechanism 30 according to Equation (1) given below (step S208). When the calculated rotation angle θe of the engine 22 is not less than 720 degrees, the rotation angle θe is regulated to be less than 720 degrees (steps S210 and S212). This is because 1 cycle of the 4-cycle engine is 720 degrees.

$$\theta e = (\rho \cdot \Delta\theta 1 + \Delta\theta 2)/(1+\rho) \quad (1)$$

After reading the rotation angle θe of the engine 22 multiple times, the CPU 72 calculates a gradient a of the revolving speed of the engine 22 from the input multiple rotation angles θe (step S102) and determines an expected engine stop position θs based on the calculated gradient a of the revolving speed (step S104). Since the fuel injection into the engine 22 is stopped, the revolving speed of the engine 22 decreases with elapse of time. The expected engine stop position θs is accordingly obtained as the rotation angle of the engine 22 when the revolving speed decreasing with elapse of time is equal to zero.

The CPU 72 subsequently determines a target stop position θt, which is closest to the expected engine stop position θs (step S106). The target stop position θt is set at a position far from a first compression stroke at a subsequent start of the engine 22, that is, at a top dead center of a piston in the compression stroke in the embodiment. The CPU 72 stands by until the rotation angle θe of the engine 22 approaches to the target stop position θt (steps S108 and S110). This process may wait until the rotation angle θe coincides with a specific angle prior to the target stop position θt by a preset value. It is preferable that the specific angle is prior to the expected engine stop position θs, in order to prevent the rotations of the engine 22 from being stopped.

When the rotation angle θe of the engine 22 approaches to the target stop position θt, the CPU 72 controls operations of the motors MG1 and MG2 to make the engine 22 stop at the target stop position θt (step S112), and subsequently controls operations of the motors MG1 and MG2 to hold the rotation angle θe of the engine 22 at the target stop position θt over a predetermined time period (step S114). The program then exits from this operation stop-time processing routine. The rotation angle θe of the engine 22 should be held for the predetermined time period, because of the following reason. As mentioned previously, in this embodiment, the target stop position θt is set at the top dead center of the piston in the compression stroke. Unless the rotation angle θe of the engine 22 is held until a decrease in internal pressure of the cylinder to a certain level, the position of the engine 22 may be shifted from the target stop position θt. The predetermined time period for holding the rotation angle θe is accordingly a time period required for the decrease in internal pressure of the cylinder to the certain level that prevents the position of the engine 22 from being shifted from the target stop position θt. This time period depends upon the properties of the engine 22. The torque required for such holding is set by taking into account the frictional force of the engine 22.

Figure 4:
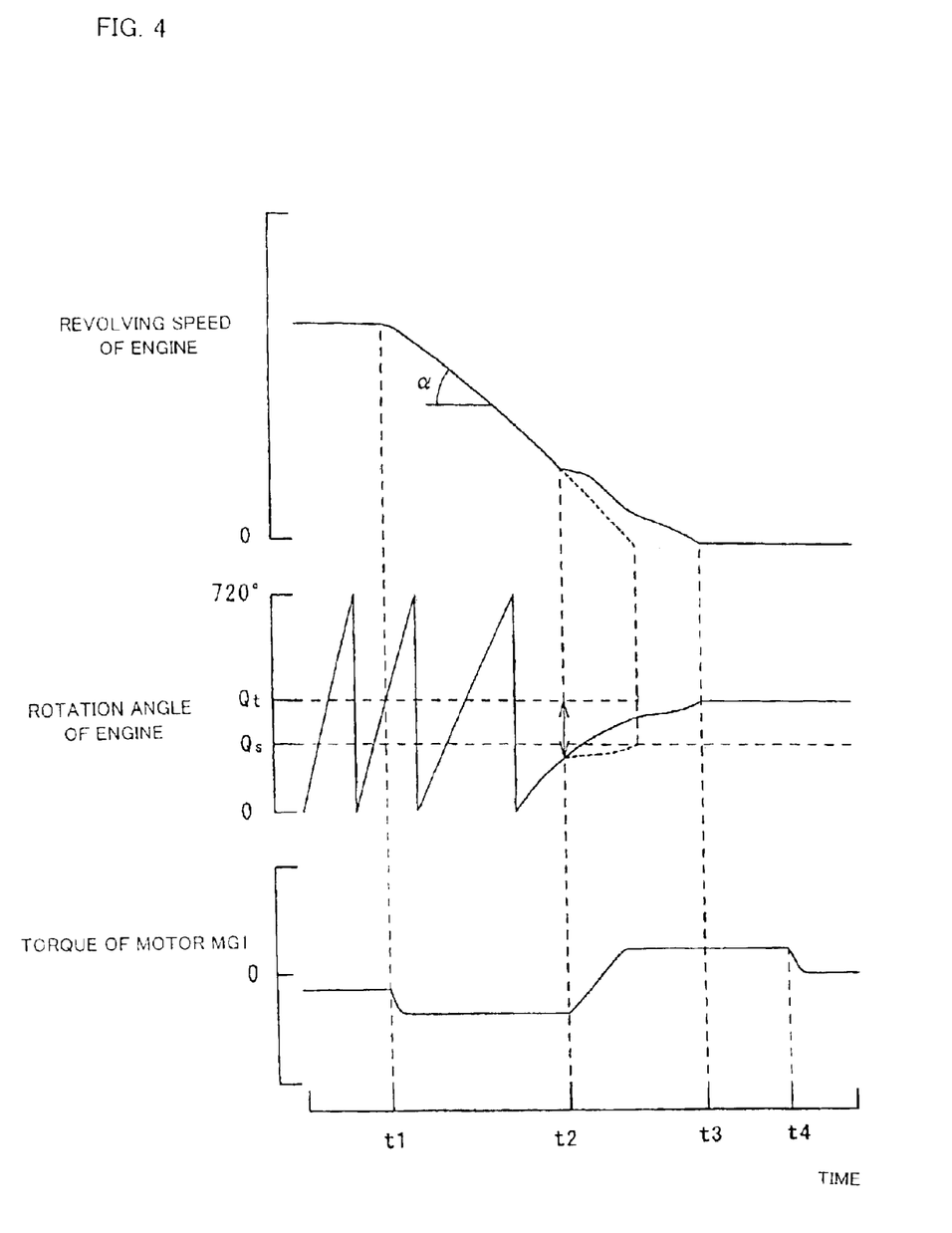
FIG. 4 shows variations in revolving speed of the engine 22, rotation angle θe of the engine 22, and torque of the motor MG1 against time when the engine 22 stops operations.

FIG. 4 shows variations in revolving speed of the engine 22, rotation angle θe of the engine 22, and torque of the motor MG1 against time when the engine 22 stops operations. As shown in the graph, in response to an operation stop instruction of the engine 22 at a time point t1, the engine ECU 24 stops fuel injection to lower the revolving speed of the engine 22. At a time point t2 when the rotation angle θe of the engine 22 approaches to the target stop position θt closest to the expected engine stop position θs calculated from the gradient α of the revolving speed, control of the operations of the motor MG1 starts to make the engine 22 stop at the target stop position θt. The motor MG2 handles the reaction force of the torque output from the motor MG1 to the crankshaft 26. The motor MG2 functions to hold the position of the crankshaft 26 of the engine 22 for a predetermined time period from a time point t3 when the engine 22 stops at the target stop position θt to a time point t4.

In the hybrid vehicle 20 of the embodiment, the engine 22 is stopped at the top dead center of the piston in the compression stroke, which is far from the first compression stroke at the subsequent start of the engine 22. In the first compression stroke at the subsequent start of the engine 22, the revolving speed of the engine 22 stopped at the top dead center is significantly higher than the revolving speed of the engine 22 stopped at a position close to the first compression stroke. Such control ensures the smoother first compression stroke at the subsequent start of the engine 22, thus allowing for a quicker start of the engine 22 and enhancing the starting ability of the engine 22. The motor MG2 holds the crankshaft 26 to prevent its rotation for a predetermined time period after the engine 22 stops at the target stop position θt. This arrangement effectively prevents the rotation angle θe of the engine 22 at the stop from being shifted from the target stop position θt due to the internal pressure of the cylinder in the engine 22.

For simplicity of explanation, the embodiment regards the single-cylinder engine. The principle of the invention is also applicable to any multiple-cylinder engines. In such application, the first compression stroke means a compression stroke of a cylinder that initially has the compression stroke after a start of engine cranking. The proximate compression stroke means a compression stroke of any cylinder that has the compression stroke immediately before the first compression stroke.

In the hybrid vehicle 20 of the embodiment, the control is carried out to make the engine 22 stop at the top dead center of the piston in the compression stroke, which is far from the first compression stroke. The engine stop position is, however, not restricted to the top dead center of the piston in the compression stroke, but may be before or after the top dead center of the piston. When the control stops the engine 22 at a position before the top dead center of the piston, the piston is moved to the top dead center at the time of the subsequent start of the engine 22. This requires some compression. The internal pressure of the cylinder is sufficiently low while the engine 22 is at a stop. Only a small torque is thus required for this compression. The first compression stroke means a first stroke of the piston from the bottom dead center to the top dead center at the time of starting the engine 22. The target stop position θt may be any position that ensures a smooth compression stroke.

In the hybrid vehicle 20 of the embodiment, the control is carried out to calculate the displacement angles Δθ1 and Δθ2, which are reset in response to input of the reference pulse, from the rotational positions θ1 and θ2 of the motors MG1 and MG2 measured by the rotational position detection sensors 43 and 44 and determine the rotation angle θe of the engine 22 based on the calculated displacement angles Δθ1 and Δθ2 and the gear ratio ρ set in the power distribution and integration mechanism 30. In a modified structure, the rotation angle of the engine 22 may be measured directly.

Figure 5:
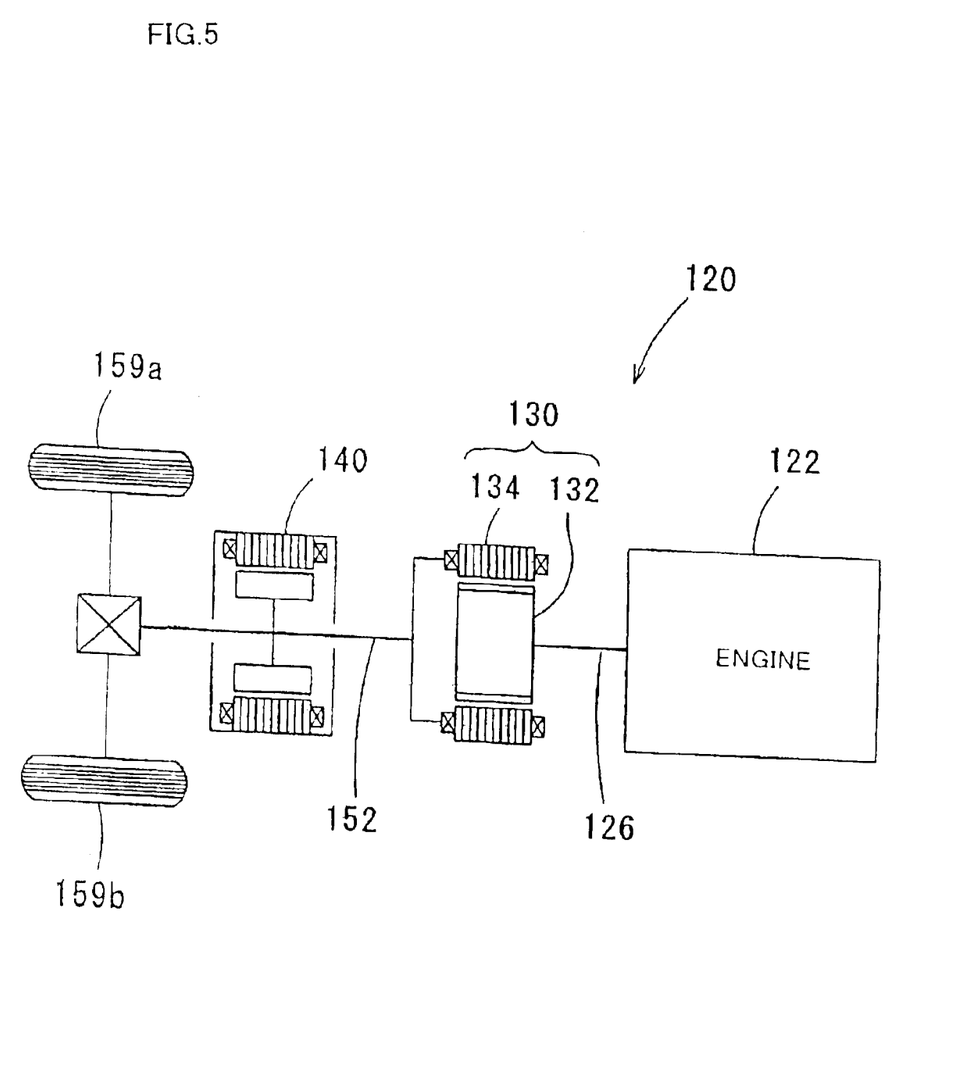
FIG. 5 schematically illustrates the construction of a hybrid vehicle 120 in a modified example.

The hybrid vehicle 20 of the embodiment has the power distribution and integration mechanism 30 and the motors MG1 and MG2 attached to the power distribution and integration mechanism 30 as the structure to make the engine 22 stop at the top dead center of the piston in the compression stroke. Any other structure may be applied to make the engine 22 stop at the top dead center of the piston in the compression stroke, that is, to output a torque to the crankshaft 26 of the engine 22. One example of such modification is a hybrid vehicle 120 shown in FIG. 5. This hybrid vehicle 120 has a motor 130, which includes an inner rotor 132 linked with a crankshaft 126 of an engine 122 and an outer rotor 134 attached to a drive shaft 152 coupled with driving wheels 159a and 159b, where the inner rotor 132 and the outer rotor 134 rotate relative to each other through electromagnetic actions. The hybrid vehicle 120 also has a motor 140 that directly outputs power to the drive shaft 152 and a parking lock mechanism 190 that directly locks the drive shaft 152. In the hybrid vehicle 120 of this modified example, the motor 140 linked with the drive shaft 152 handles the reaction force, while the other motor 130 makes the engine 122 stop at a desired position. The hybrid vehicle 120 of the modified example thus exerts the similar effects to those of the hybrid vehicle 20 of the embodiment discussed above.

The above embodiments are to be considered in all aspects as illustrative and not restrictive. There may be many modifications, change, and alterations without departing from the scope or sprit of the main characteristics of the present invention. All changes within the meaning and range of equivalency of the claims are therefore intended to be embraced therein.

What is claimed is:

1. A driving apparatus, comprising:

an internal combustion engine;

a torque output device that outputs a torque to an output shaft of said internal combustion engine; and a controller that controls said internal combustion engine to stop operations of said internal combustion engine in response to an operation stop instruction of said internal combustion engine, while controlling operations of said torque output device on the basis of a first compression stroke at a subsequent start of said internal combustion engine as a standard, in order to make said internal combustion engine stop at a target stop position that is different from the standard by a predetermined angle.

2. A driving apparatus in accordance with claim 1, said driving apparatus further comprising:

a rotation angle sensor that measures a rotation angle of the output shaft of said internal combustion engine, wherein said controller controls the operations of said torque output device to make said internal combustion engine stop at the target stop position, based on the rotation angle measured by said rotation angle sensor.

3. A driving apparatus in accordance with claim 2, wherein said controller expects a stop position of said internal combustion engine based on a variation in observed rotation angle and controls the operations of said torque output device based on the expected stop position, in order to make said internal combustion engine stop at the target stop position.

4. A driving apparatus in accordance with claim 1, wherein said controller controls the operations of said torque output device, in order to make said internal combustion engine stop at the target stop position, while revolving speed of said internal combustion engine decreases to zero.

5. A driving apparatus in accordance with claim 1, wherein the target stop position is a specific position that is far from the first compression stroke.

6. A driving apparatus in accordance with claim 5, wherein said controller controls the operations of said torque output device, in order to hold said internal combustion engine at the target stop position for a predetermined time period.

7. A driving apparatus in accordance with claim 1, wherein the target stop position is a specific position in a proximate compression stroke immediately before the first compression stroke at the subsequent start of said internal combustion engine.

8. A driving apparatus in accordance with claim 7, wherein the target stop position is set approximately at a top dead center of a piston in the proximate compression stroke.

9. A driving apparatus in accordance with claim 7, wherein said controller controls the operations of said torque output device, in order to hold said internal combustion engine at the target stop position for a predetermined time period.

10. A driving apparatus in accordance with claim 1, said driving apparatus further comprising:

a three-shaft power distribution and integration mechanism that has three shafts respectively linked with the output shaft of said internal combustion engine, a drive shaft, and a rotating shaft, where power input into and output from a residual one shaft among the three shaft is determined according to powers input into and output from any two shafts among the three shafts, wherein said torque output device comprises a first motor that outputs a torque to the rotating shaft, and a second motor that outputs a torque to the drive shaft.

11. A driving apparatus in accordance with claim 10, said driving apparatus further comprising:

a rotation angle sensor that measures a rotation angle of the output shaft of said internal combustion engine, based on a rotation angle of the drive shaft and a rotation angle of the rotating shaft, wherein said controller controls the operations of said torque output device to make said internal combustion engine stop at the target stop position, based on the rotation angle measured by said rotation angle sensor.

12. A driving apparatus in accordance with claim 1, wherein said torque output device comprises a pair-rotor motor and a drive shaft motor that outputs a torque to the drive shaft, said pair-rotor motor comprising a first rotor that is linked with the output shaft of said internal combustion engine and a second rotor that is linked with the drive shaft and is rotatable relative to the first rotor, where the first rotor is driven and rotated relative to the second rotor through electromagnetic actions.

13. An automobile, comprising:

an internal combustion engine;

a torque output device that outputs a torque to an output shaft of said internal combustion engine; and a controller that controls said internal combustion engine to stop operations of said internal combustion engine in response to an operation stop instruction of said internal combustion engine, while controlling operations of said torque output device on the basis of a first compression stroke at a subsequent start of said internal combustion engine as a standard, in order to make said internal combustion engine stop at a target stop position that is different from the standard by a predetermined angle.

14. An automobile in accordance with claim 13, said automobile further comprising:

a rotation angle sensor that measures a rotation angle of the output shaft of said internal combustion engine, wherein said controller controls the operations of said torque output device to make said internal combustion engine stop at the target stop position, based on the rotation angle measured by said rotation angle sensor.

15. An automobile in accordance with claim 14, wherein said controller expects a stop position of said internal combustion engine based on a variation in observed rotation angle and controls the operations of said torque output device based on the expected stop position, in order to make said internal combustion engine stop at the target stop position.

16. An automobile in accordance with claim 13, wherein said controller controls the operations of said torque output device, in order to make said internal combustion engine stop at the target stop position, while revolving speed of said internal combustion engine decreases to zero.

17. An automobile in accordance with claim 13, wherein the target stop position is a specific position that is far from the first compression stroke.

18. An automobile in accordance with claim 13, wherein the target stop position is a specific position in a proximate compression stroke immediately before the first compression stroke at the subsequent start of said internal combustion engine.

19. An automobile in accordance with claim 18, wherein the target stop position is set approximately at a top dead center of a piston in the proximate compression stroke.

20. An automobile in accordance with claim 18, wherein said controller controls the operations of said torque output device, in order to hold said internal combustion engine at the target stop position for a predetermined time period.

* * * * *